(12) United States Patent
Kunst et al.

(10) Patent No.: US 9,167,644 B2
(45) Date of Patent: *Oct. 20, 2015

(54) MULTI-STRING LED CURRENT CONTROL SYSTEM AND METHOD

(71) Applicant: Google Inc., Mountain View, CA (US)

(72) Inventors: David Kunst, Cupertino, CA (US); Barry Loveridge, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/164,500

(22) Filed: Jan. 27, 2014

(65) Prior Publication Data

US 2015/0123550 A1    May 7, 2015

Related U.S. Application Data

(63) Continuation of application No. 13/245,651, filed on Sep. 26, 2011, now Pat. No. 8,638,045.

(60) Provisional application No. 61/440,369, filed on Feb. 7, 2011, provisional application No. 61/442,672, filed on Feb. 14, 2011.

(51) Int. Cl.
*H05B 41/28* (2006.01)
*H05B 33/08* (2006.01)

(52) U.S. Cl.
CPC ........ *H05B 33/0815* (2013.01); *H05B 33/0827* (2013.01); *H05B 33/0845* (2013.01); *H05B 33/0875* (2013.01); *H05B 33/0833* (2013.01); *Y02B 20/347* (2013.01)

(58) Field of Classification Search
USPC ................ 315/247, 224, 225, 274–289, 291, 315/307–326
See application file for complete search history.

(56) References Cited

U.S. PATENT DOCUMENTS

| | | | | |
|---|---|---|---|---|
| 8,368,322 B2* | 2/2013 | Yu et al. | | 315/306 |
| 8,575,863 B2* | 11/2013 | Cai et al. | | 315/307 |
| 8,847,518 B2* | 9/2014 | Kimura | | 315/307 |
| 2007/0210722 A1 | 9/2007 | Konno et al. | | |
| 2009/0072764 A1* | 3/2009 | Kitagawa et al. | | 315/320 |
| 2012/0025733 A1* | 2/2012 | Melanson | | 315/287 |

FOREIGN PATENT DOCUMENTS

| CN | 201680198 | 12/2010 |
|---|---|---|
| CN | 201706260 | 1/2011 |

* cited by examiner

*Primary Examiner* — Tuyet Vo
(74) *Attorney, Agent, or Firm* — Edward A. Gordon; Foley & Lardner LLP (57) ABSTRACT

Embodiments described herein provide a LED lighting system and method. A transformer has a primary winding and a secondary winding. A plurality of LED strings are coupled to the secondary winding of the transformer. At least one switch is coupled to at least one of the plurality of LED strings. A controller is coupled to the at least one switch and configured to control the operation of the at least one switch such that current flows through the plurality of LED strings in an alternating manner.

17 Claims, 9 Drawing Sheets

MULTI-STRING LED CURRENT CONTROL SYSTEM AND METHOD

RELATED APPLICATION

This application is a continuation of U.S. application Ser. No. 13/245,651, filed Sep. 26, 2011, which claims priority to U.S. Provisional Patent Application No. 61/440,369, filed Feb. 7, 2011, and claims priority to U.S. Provisional Patent Application No. 61/442,672, filed Feb. 14, 2011, all of which are incorporated by reference herein in their entirety.

TECHNICAL FIELD

This disclosure relates to the field of light emitting diodes (LEDs) and, in particular, to multi-string LED devices.

BACKGROUND

In recent years, solid state lighting devices, such as light emitting diodes (LEDs), have become widely used in a wide variety of industries and product lines. LED applications are now even becoming common as a replacement for traditional incandescent light bulbs.

However, LED light bulbs often create undesirable colors or color temperatures, as the light generated often appears as being "cool" or blue. Thus, attempts have been made to control the color of the light using phosphor in various ways. However, the use of phosphor to control color temperature of LEDs increases cost and reduces efficiency of solid state lighting. In addition, color temperature is not well controlled as operating conditions vary, such as when LED temperature and bias current change.

Other attempts have been made to control the color temperature by regulating current flow in a controlled manner in multi-string LED assemblies (e.g., having LED strings of different colors). For example, one method involves the use of a direct current-to-direct current (DC/DC) converter on the secondary side of a primary side controlled alternating current-to-direct current (AC/DC) flyback converter. However, such solutions are expensive due in part to the DC/DC converter and lack the flexibility to easily tune the circuit in production to account for lot-to-lot variations in LEDs and variations in other control circuit elements. In order to provide tuning, a micro-controller may be added. However, doing so even further increases costs.

Overall, the existing solutions are too expensive and too big for mass produced solid state light bulbs, especially for the retro-fit incandescent bulb replacement market.

BRIEF DESCRIPTION OF THE DRAWINGS

The present disclosure is illustrated by way of example, and not by way of limitation, in the figures of the accompanying drawings.

DETAILED DESCRIPTION

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

In the following detailed description, for purposes of explanation, numerous specific details are set forth in order to provide a thorough understanding of the subject matter of the present application. It will be evident, however, to one skilled in the art that the disclosed embodiments, the claimed subject matter, and their equivalents may be practiced without these specific details.

The detailed description includes references to the accompanying drawings, which form a part of the detailed description. The drawings show illustrations in accordance with example embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Embodiments described herein utilize an alternative method of controlling solid state lighting (SSL) color temperature. Instead of using white or blue LEDs, with different remote phosphors to control color temperature, embodiments described herein use, for example, multiple strings of different color light emitting diodes (LEDs), such as red and blue LEDs, and precisely control the ratio of currents in the different color LED strings to control color temperature. The currents in the multiple strings of LEDs are time multiplexed or pulse width modulated to achieve the desired color temperature, which may be controlled to maintain a constant color as operating conditions vary or shift color to mimic an incandescent bulb, which shifts toward red as the lamp is dimmed.

In some embodiments, a single constant current LED driver and output circuitry are used to divide the current between multiple LED strings controlled by a controller. No sensing of LED current is necessary, thus enabling the scheme to be used with fixed intensity drivers and drivers that are dimmable from standard lighting controls, such as triac dimmers or 0 to 10 V dimmers.

Embodiments may utilize very low cost constant voltage, constant current (CV/CC) primary side regulated (PSR) flyback converters to generate a constant secondary side output current, which is steered into separate red and blue LED strings in a pulse width modulated (PWM) fashion such that the ratio of red/blue LED current is precisely controlled in order to control color temperature under various operating conditions.

In one embodiment, a LED lighting system is provided. The LED lighting system includes a transformer having a primary winding and a secondary winding. A plurality of LED strings are coupled to the secondary winding of the transformer. At least one switch is coupled to at least one of the plurality of LED strings. A controller is coupled to the at least one switch and configured to control the operation of the at least one switch such that current flows through the plurality of LED strings in an alternating manner.

In another embodiment, a method for operating an array of LEDs is provided. A current is received through a transformer including a primary winding and a secondary winding. A first switch coupled to a first LED string of the array of LEDs and the secondary winding of the transformer is operated at a first duty cycle. A second switch coupled to a second LED string of the array of LEDs and the secondary winding of the transformer is operated at a second duty cycle such that the second switch is not activated when the first switch is activated. The first duty cycle and the second duty cycle are complementary.

In a further embodiment, a LED lighting apparatus is provided. The LED lighting apparatus includes a plurality of LED strings and at least one switch the plurality of LED strings. A controller is coupled to the at least one switch and configured to control the operation of the at least one switch in a complementary manner when the plurality of LEDs is provided with a current such that only one of the at least one switch is activated at a time and the current only flows through one of the plurality of LED strings at a time.

Figure 1:
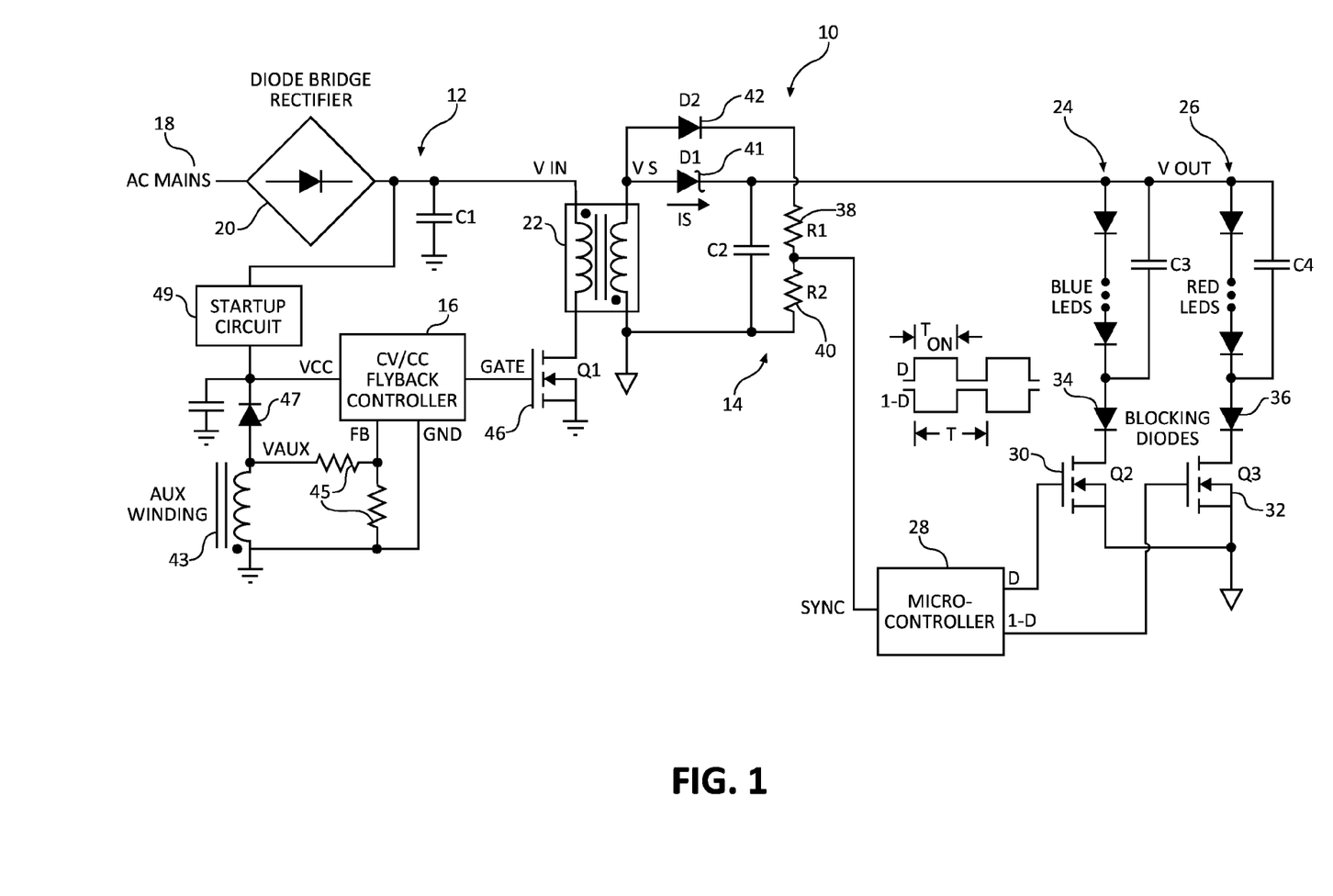
FIG. 1 is a schematic view illustrating an embodiment of a LED lighting system.

FIG. 1 is a schematic view illustrating a LED lighting system 10 according to an embodiment. The lightning system 10 includes a primary side 12 and a secondary side 14. On the primary side 12, a constant voltage, constant current (CV/CC) primary side flyback controller 16 converts AC power from a main AC power supply 18 through a diode bridge rectifier 20 from the primary side to DC power on the secondary side 14 using a flyback transformer 22, which has a primary winding (i.e., an inductor) associated with the primary side 12 and a secondary winding associated with the secondary side 14. On the secondary side 14, the DC power is provided to multiple strings of LEDs 24 and 26. In one embodiment, the LEDs within the strings of LEDs 24 and 26 are different colors. For example, the LEDs in string 24 may be blue (or a "cool" or "bluish" white), and the LEDs in string 26 may be red. Although only two strings of LEDs are shown in FIG. 1, it should be understood that a greater number (e.g., three or more) of LED strings may be used in other embodiments. Further, although only two LEDs are explicitly shown in each of the strings, it should be understood that any number of LEDs could be used, depending on the specific application.

A micro-controller (or switch controller) 28 is coupled to the LED strings 24 and 26 through switches (e.g., field effect transistors (FET)) 30 and 32, respectively, and alternately activates the switches 30 and 32 such that current only flows through one of the switches at a time. The controller 28 may be a pulse width modulation (PWM) circuit that may control the ratio of red/blue LED current to control color temperature. Color temperature may be maintained or shifted as operating conditions change. For example, LED current and junction temperature may change when dimming is provided with a conventional triac-based wall dimmer. In one embodiment, the color temperature of the lighting system 10 may be maintained when dimmed or shifted in order to mimic incandescent bulbs, which shift toward red when dimmed.

In one embodiment, the controller 28 operates the switches 30 and 32 with complementary duty cycles (i.e., the sum of the duty cycles is 1). That is, if the duty cycle for switch 30 is D, then the duty cycle D' for switch 32 is 1−D.

Duty cycle D represents the portion of time switch 30 is on. For example, if the time that switch 30 is on is denoted as $T_{ON}$ and the time from the rising edge of D to the next rising edge of D is denoted T, where T is the PWM cycle period, then D is defined as $T_{ON}/T$. Assuming the flyback converter's average output current is I, current through LED string 24 is I·D and current through LED string 26 is I·(1−D). The ratio of blue/red LED string current is D/(1−D). By varying D, the ratio of the currents through each string may be controlled without explicitly measuring the current flow though the LED strings 24 and 26.

Although two switches 30 and 32 are shown (i.e., one switch for each LED string) it should be understood that in a two LED string arrangement, the system may operate with only one switch. For example, if the minimum forward voltage of one of the LED strings (e.g., LED string 24) is sufficiently higher than the maximum forward voltage of the other LED string (e.g., LED string 26), the controller 26 only needs to generate 1−D control for switch 32. When switch 32 is on (i.e., LED string 26 activated), due to its sufficiently lower forward voltage, LED string 24 will automatically be deactivated, and all the current will flow through LED string 26.

The algorithm dictating the operation of the controller 28 may maintain a fixed color, or fixed color temperature, based on changes in the environment (e.g. temperature). Alternatively, the algorithm may change the color, or color temperature, based on changes in the environment (e.g. time of day, ambient light, and ambient color).

Still referring to FIG. 1, blocking diodes 34 and 36 block current flow in the parasitic body diodes of the switches 30 and 32, respectively. The blocking diodes 34 and 36 prevent parasitic current flow between the LED strings 24 and 26 which may occur if the forward voltage of the two LED strings 24 and 26 are not identical. A blocking diode may not be required for the LED string with the lowest forward voltage.

In one embodiment, the flyback controller 16 includes a primary side regulated (PSR) integrated circuit (IC) and regulates both output voltage and current as needed, such as providing a constant current or a constant voltage, depending on system requirements. For example, in the present application, the PSR IC may operate in constant current mode to drive the LED strings 24 and 26, while constant voltage mode may be used for over voltage protection, which may protect against certain fault conditions, such as open circuit faults in the LED strings.

As will be described in greater detail below, in one embodiment, the PSR controller IC is used to sense secondary side conditions reflected across the transformer 22, and the switching of switches 30 and 32 are synchronized with flyback controller 16 switching in order to prevent harmful disturbances of critical PSR control signals, which otherwise may degrade LED current regulation accuracy and stability, and to ensure highest efficiency by only permitting PWM switching when the secondary winding current is zero, thereby minimizing switching losses. This synchronization is enabled by resistors (R1, R2) 38 and 40 and diode (D2) 42 shown in FIG. 1. Generally, the auxiliary winding voltage ($V_{AUX}$) is provided from auxiliary transformer winding 43 to the flyback controller 16 through a resistor divider 45 to allow the controller 16 to sense secondary side output voltage and transformer 22 reset time. The startup circuit 49 may be an active circuit, or as simple as a resistor. After startup, power ($V_{CC}$) is provided to the controller 16 through a rectifier diode 47. Other details of the synchronization are provided in subsequent sections. It should be noted that although the components used for generating power ($V_{CC}$) and providing feedback may not be shown in subsequent figures (e.g., FIG. 7), the embodiments described below may utilize similar components in a manner similar to FIG. 1.

Figure 2:
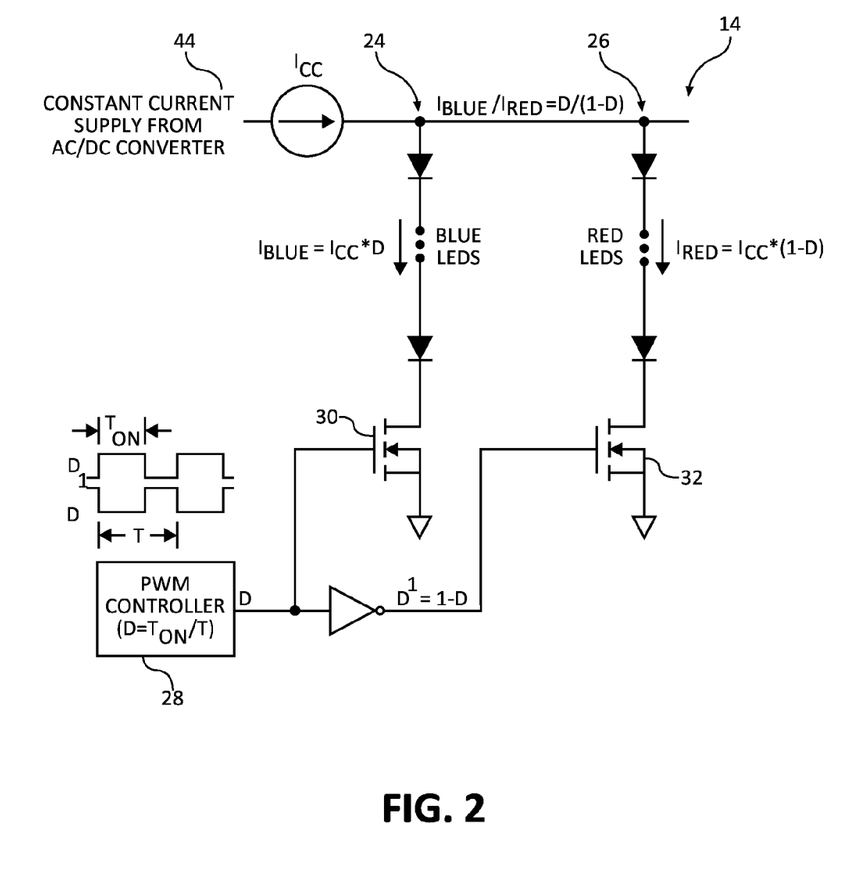
FIG. 2 is a schematic view illustrating an embodiment of a secondary side of a LED lighting system.

FIG. 2 is a simplified view of the secondary side 14 of the lighting system 10. However, the power source referred to in FIG. 2 has been simplified and the blocking diodes 34 and 36 (in FIG. 1) have been omitted for clarity. In FIG. 2, a constant current source ($I_{CC}$) 44 is provided by a PSR AC/DC controller on the primary side, such as the flyback controller 16 in FIG. 1. In this example, separate blue and red LED strings 24 and 26 are connected in parallel, and $I_{CC}$ is steered into either the blue string 24 or the red string 26 in a time multiplexed or a PWM fashion. The controller (e.g., PWM) simply generates a duty cycle, D, which represents the portion of time ($T_{ON}$) of each PWM cycle period (T) that $I_{CC}$ is steered into the blue LED string 24 (i.e., D is equal to $T_{ON}$/T). In this example, $I_{CC}$ is steered into the red LED string during the remaining portion of each PWM cycle, denoted as D', where D'=1−D. Therefore, the ratio of blue/red LED string current in this example is equal to D/(1−D).

Figure 3:
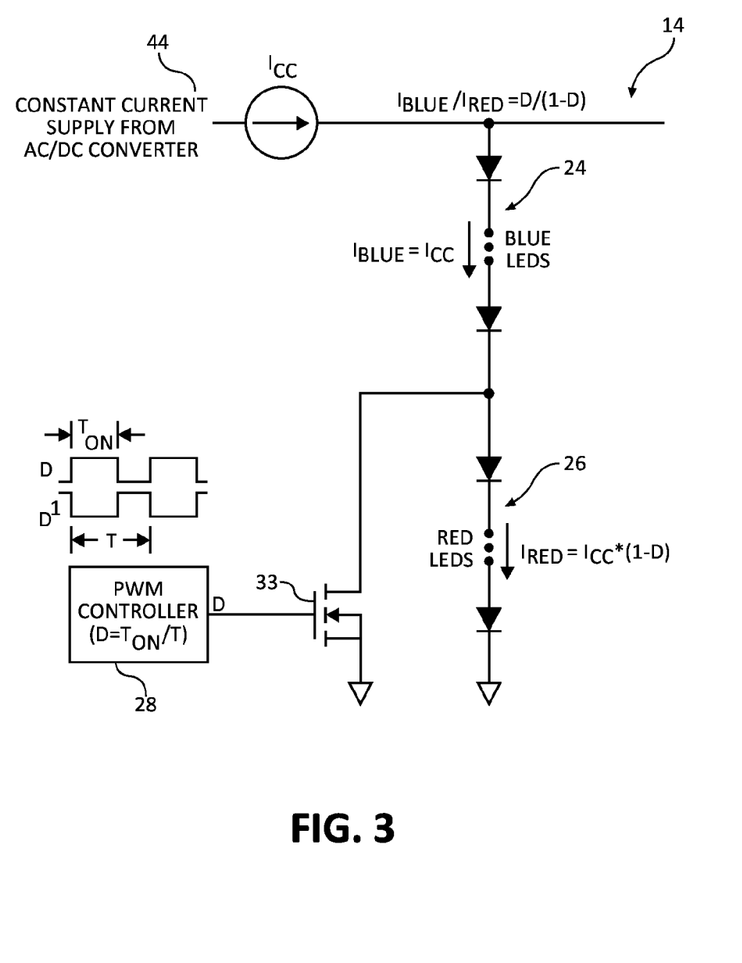
FIG. 3 is a schematic view illustrating another embodiment of a secondary side of a LED lighting system.

FIG. 3 is another simplified view of the secondary side 14 demonstrating how the system 10 may be reconfigured for a series stack of, for example, blue and red LED strings 24 and 26. For the series stack, $I_{CC}$ always flows through the blue LED string 24, while $I_{CC}$ only flows through the red LED string 26 during the portion of each PWM switching cycle when PWM switch 33 is off. In this example, the ratio of blue/red LED string current is 1/(1−D). The PWM controller 28 controls duty cycle (D) to obtain the desired color temperature profile.

As mentioned above, in one embodiment, secondary side PWM switching is synchronized with primary side flyback switching in order to prevent the possibility of untimely disturbances of PSR signal sensing to improve the stability of the circuit, and to maximize efficiency by ensuring PWM switching only occurs when secondary winding current is zero. The flyback controller 16 senses secondary side output voltage and transformer reset time in order to control output current and provide fault protection, such as over voltage protection. Rather than using an opto-coupler to provide feedback, the controller 16 senses the voltage on an auxiliary transformer winding, which also provides power to the controller 16.

Figure 4:
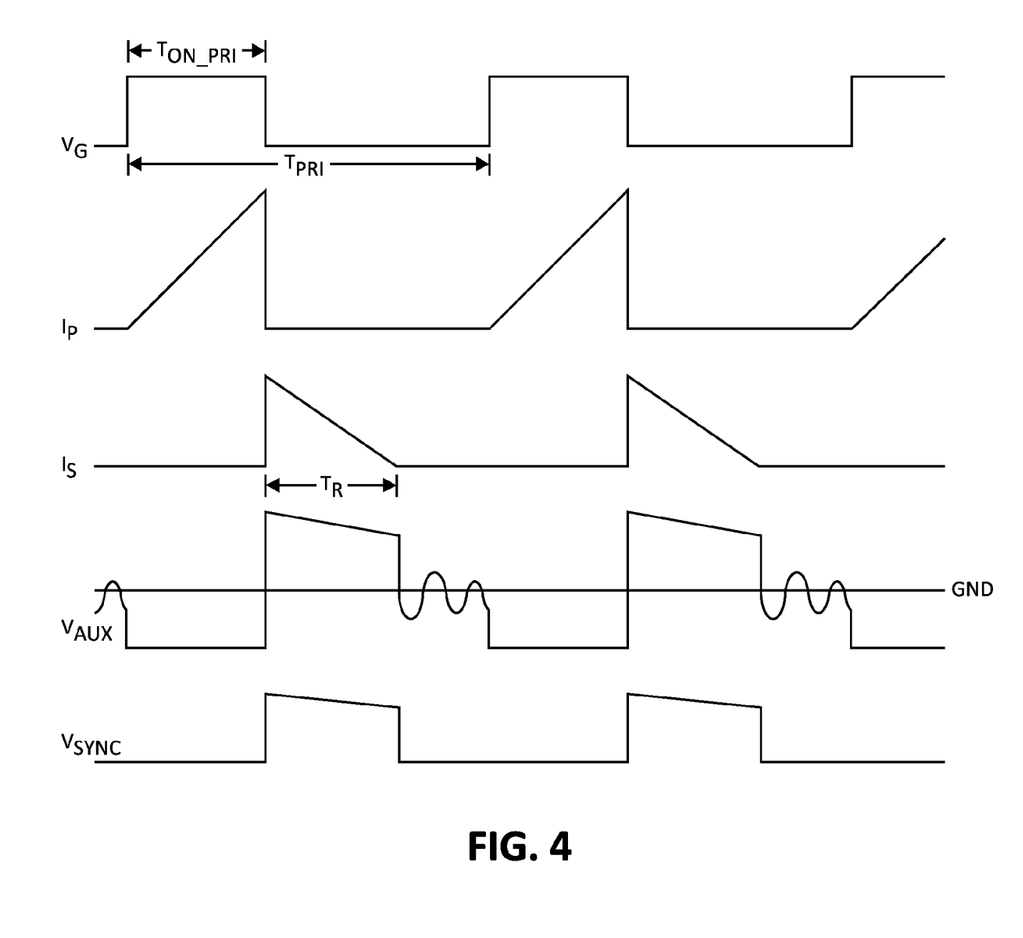
FIG. 4 is temporal view illustrating various waveforms associated with a LED lighting system according to one embodiment.

FIG. 4 illustrates switching waveforms according to one embodiment. $V_G$ represents the primary side power FET 46 gate voltage. $I_P$ is the primary winding current in the transformer 22 (FIG. 1), and $I_S$ is the secondary winding current in the transformer 22. Vs is the secondary winding voltage in the transformer 22. $V_{SYNC}$ is a generated signal that may be generated with a signal diode (e.g., diode 42) and resistor divider (e.g., resistors 38 and 40).

The primary side auxiliary winding voltage may be expressed as $$V_{AUX}=V_S \cdot N_{AUX}/N_S, \quad (1)$$

where $N_{AUX}$ and $N_S$ are the number of turns in the auxiliary and secondary windings, respectively. $V_S$ may be expressed as $$V_S=V_{OUT}+V_F+I_S \cdot R_S, \quad (2)$$

where $V_{OUT}$ is the output voltage, $I_S$ is the secondary winding current, $V_F$ is the forward voltage drop of the secondary side rectifier diode 41 (D1), and $R_S$ represents the parasitic resistance in the secondary winding circuit. Combining Equations 1 and 2 yields $$V_{AUX}=(V_{OUT}+V_F+I_S \cdot R_S) \cdot N_{AUX}/N_S \quad (3)$$

Therefore, in order to accurately sense the secondary side output voltage, the primary side controller (e.g., the flyback controller 16) samples the auxiliary winding voltage in a manner that minimizes errors related to the current dependent terms in Equation 3 (i.e., $V_F+I_S \cdot R_S$). This may be accomplished by sampling the auxiliary winding voltage at the "knee" (in FIG. 5) when $I_S$ is approximately zero.

Figure 5:
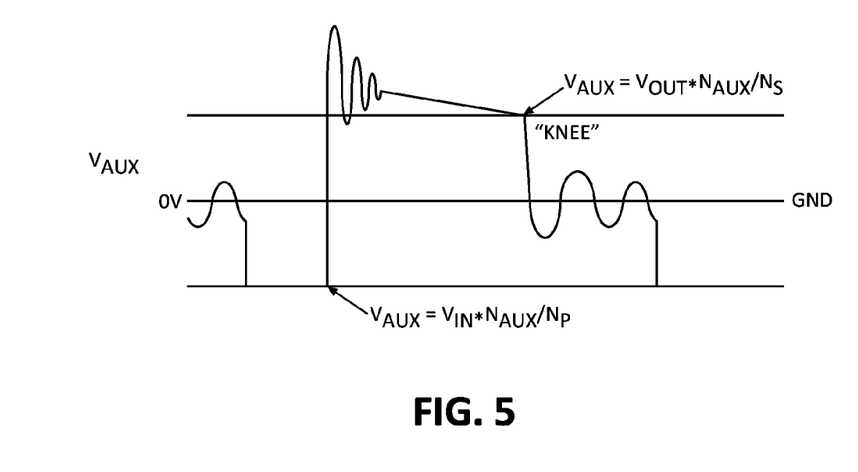
FIG. 5 is a temporal view illustrating one of the waveforms of FIG. 4 in greater detail.

A more detailed look at the characteristics of the auxiliary winding waveform is provided in FIG. 5. PSR control ICs operate under the principle of sensing the auxiliary winding voltage at the "knee" in the curve, which occurs when the secondary winding current $I_S$ reaches zero, at which time the reflected voltage coupled across the transformer from the secondary winding to the auxiliary winding does not include output current dependent errors (i.e., $V_F$ and $I_S \cdot R_S$). In addition, the "knee" signifies the end of the transformer reset time, $T_R$, which is also needed in the CV/CC regulation control algorithm.

For example, some PSR ICs may regulate output current by maintaining a constant ratio of $T_R/T_{PRI}$, where $T_{PRI}$ is the flyback switching cycle period. Therefore, accurate sensing of flyback reset time $T_R$ via the reflected voltage signal across the transformer from the secondary winding to the auxiliary winding is required, and this sensing must not be distorted by switching currents from one LED string to the other LED string, especially when the forward voltage drops of the two LED strings are substantially different.

In order to avoid disturbances of the auxiliary winding voltage at the "knee," LED switching is synchronized to flyback switching (i.e., synchronized with the switching of primary side switch 46), for example, by forcing PWM switching (e.g., activating one of the LED strings 24 and 26 and deactivating the other LED string 24 and 26) to occur when secondary side current is zero. In a typical multi-string LED lighting application, the typical flyback controller switching frequency may be 50~200 kHz, while the LED PWM switching frequency may be ~1 kHz. A digital PWM duty cycle generation circuit may be formed using the SYNC signal, which may be produced with the signal diode 42 and resistors 38 and 40 shown in FIG. 1.

By enabling the controller 28 to sense the secondary winding voltage ($V_S$) swing on the transformer 22, the switching of switches 30 and 32 may be synchronized to the flyback switching. Synchronizing the switching of switches 30 and 32 such that they are commanded to switch when a sudden drop in the secondary voltage is detected (i.e., occurs when secondary winding current decays to zero or when the main flyback FET 46 turns on) prevents distortions being reflected through the transformer 22 to the flyback controller 16. This may minimize potential problems that may be created by steps in output voltage (e.g., when LED strings are switched) that would be reflected back through the transformer to the flyback controller and disrupt the controller. Additionally, synchronization ensures maximum efficiency by enforcing zero current PWM switching, which minimizes PWM switching losses.

Additionally, with this feedback, the controller 28 may determine the relative currents being delivered to the LED strings 24 and 26 without the need of a current sense resistor. This information may be included in the algorithm that determines D and 1−D, enabling the color or color temperature control of the LED lighting system. For example, this may allow the color temperature to shift lower as the LED strings 24 and 26 are dimmed, enabling the system to match the shift towards red that occurs in an incandescent lamp when it is dimmed.

Figure 6:
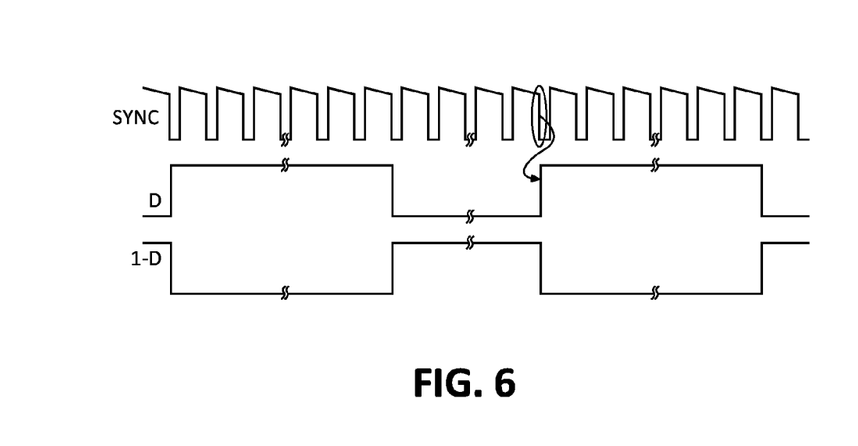
FIG. 6 is a temporal view illustrating a synchronization of a LED lighting system according to one embodiment.

FIG. 6 illustrates an exemplary timing diagram of the SYNC signal compared with the duty cycles of switches 30 and 32. In the example shown, the duty cycle control signals D and 1−D are synchronized to the falling edge of the SYNC signal, which corresponds to the end of the transformer reset time, which occurs when the secondary winding current reaches zero when the flyback converter operates in discontinuous or critical conduction mode or when the primary side flyback switch turns on when the converter operates in continuous conduction mode. Alternatively, PWM switching can be synchronized to the rising edge of the SYNC signal, which occurs when the primary flyback switch turns off, but in this case care must be taken to ensure that the primary side controller does not react to the subsequent momentary PWM switching transient glitch that may occur immediately following the flyback switch turn off event.

The timing diagram shown in FIG. 6 may be produced by the controller 28 shown in FIG. 1. For example, the controller 28 may include a digital counter-based PWM generator that is clocked by the SYNC signal. If the flyback converter is nominally running at 100 kilohertz (kHz), then the SYNC period is 10 microseconds (μs).

Figure 9:
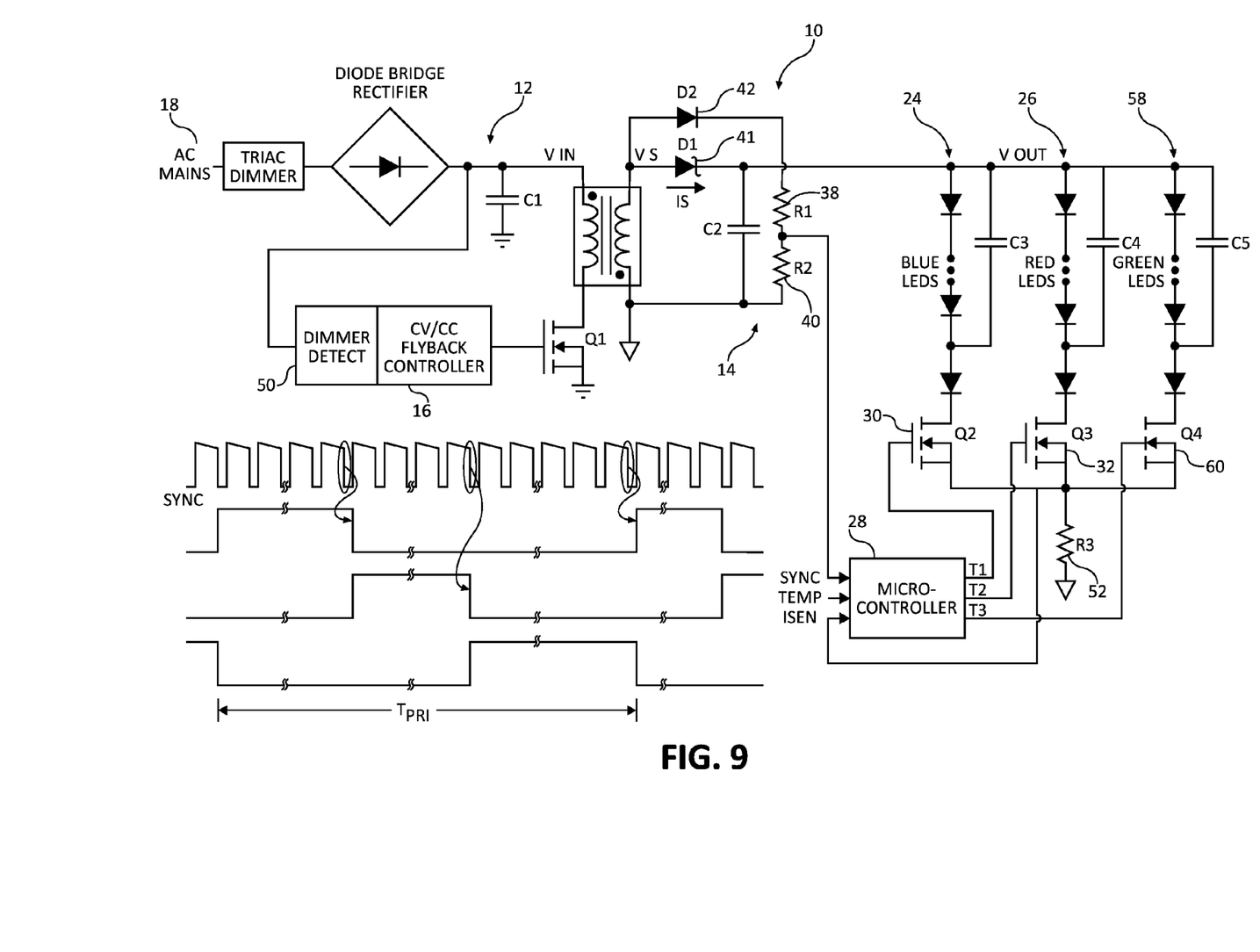
FIG. 9 is a schematic view illustrating a further embodiment of a LED lighting system.

In an embodiment in which a constant blue/red LED string current ratio of 3:2 is desired, the LED PWM frequency may be nominally set to 1 kHz, which is well above the human eye flicker detection threshold. The ratio of flyback switching to PWM switching frequency is 100:1. The PWM controller may start each PWM cycle by turning on the blue LED string 24 for 100·3/5=60 counts of SYNC, and then deactivate the blue LED string 24 while activating the red LED string 26 for the remaining 40 counts in each PWM period. In this example, D is 0.6 and D' is 0.4. Those skilled in the art will recognize other simple circuit configurations may be used for generating PWM duty cycle. Also, additional LED strings may be added (e.g., three strings, for red, blue, and green LEDs as shown in FIG. 9), provided only one string is excited at a time. For this example, the sum of the on times (i.e., T1, T2, and T3) is the PWM cycle period.

Those skilled in the art will recognize that alternative modulation methods such as Pulse Frequency Modulation (PFM), Pulse Density Modulation (PDM), and/or Pulse Skipping Modulation (PSM) may also be used to generate the D and D' signals. These alternate control algorithms may employ a constant, or substantially constant, on time ($T_{ON}$), for a given set of conditions, and modulate the off time or density of pulses to achieve the desired current ratio in the LED strings.

For example, a PFM control algorithm may be implemented in a series connected LED string application, such as that shown in FIG. 3, wherein $T_{ON}$ of switch 33 is set to a specific number of SYNC pulses for a certain set of operating conditions (e.g., input voltage, number of LEDs, output voltage, total LED current, lamp ambient temperature, etc.), and color temperature is controlled as operating conditions vary by modulating the off time ($T_{OFF}$) of the switch, where $T_{OFF}$ represents the number of SYNC pulses required to achieve the desired color temperature profile. In such an example, increasing $T_{OFF}$ increases the switching period (T), which reduces the switching frequency and effectively increases the relative amount of red light emitted from the lamp because the red LED string 26 in FIG. 3 is only activated when switch 33 is off. Decreasing $T_{OFF}$ has the opposite effect (i.e., switching frequency increases and color shifts toward blue).

Alternatively, a PDM algorithm may be implemented in controller 28 in FIG. 3, wherein color temperature is controlled by "bursting" pulses at a fixed duty cycle (e.g., 50%) for a "burst" period of time which is followed by a "quiet" period of time where no switching occurs, and current flows through either the blue string only if D is high during the "quiet" period, or through both blue and red strings if D is low during the "quiet" period. The control algorithm determines the number of SYNC pulses that are needed for the "burst" and "quiet" time periods to satisfy the desired color temperature profile.

PSM is similar to PDM and may be implemented by setting $T_{ON}$ to a fixed number of SYNC pulses for a certain set of conditions, and then selectively skipping pulses to achieve the desired LED current ratio as operating conditions change. Furthermore, a multi-string LED lighting system may employ various combinations of PWM, PFM, PDM, and PSM modes of operation depending on the operating conditions. For example, an LED lamp may operate in PWM mode when the light output is at high intensity and transition to PFM mode when the lamp is dimmed below a certain threshold.

Figure 7:
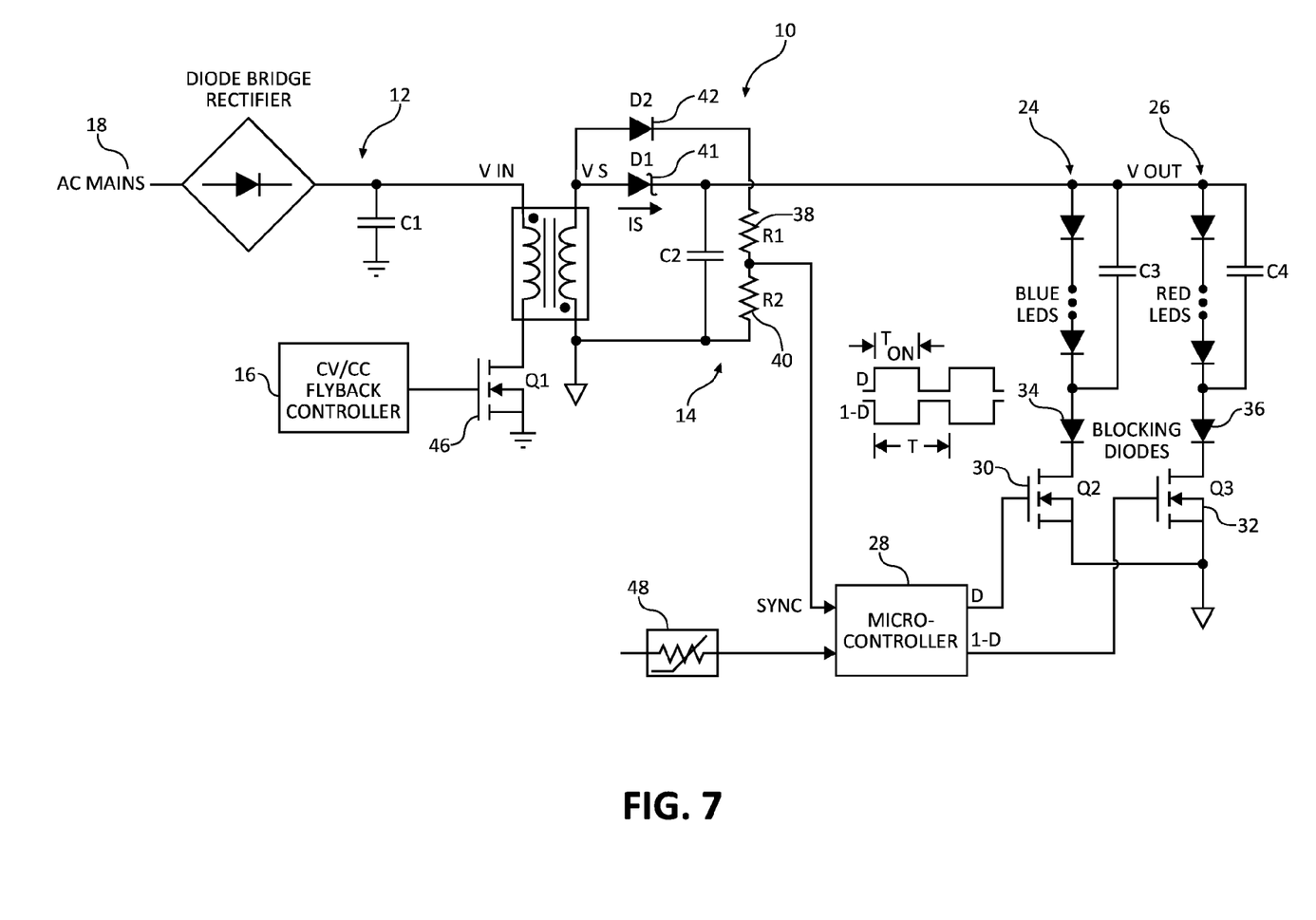
FIG. 7 is a schematic view illustrating another embodiment of a LED lighting system.

FIG. 7 illustrates another embodiment of the LED lighting system 10. Because the light output of LEDs changes with temperature, and different types of LEDs have different temperature coefficients, temperature compensation may be added to the controller 28 to control color temperature as the system's ambient temperature and LED junction temperature vary. In the embodiment shown in FIG. 7, a remote temperature sensor (e.g., a thermistor) 48 is included and provides a signal representative of a temperature to the controller 28. The temperature sensor 48 may be positioned close to the LEDs to measure LED temperature. Other remote temperature sensors may be used in other embodiments, such as diodes and transistors, or a temperature sensor may be integrated in the controller 28 to provide temperature compensation of the LED lighting device. The controller 28 may include a temperature-to-digital converter to quantify the sensed temperature and use the temperature information in the duty cycle control algorithm. Duty cycle generation and/or adjustment may be provided with an algorithm that includes a lookup table, for example, which is indexed based on the temperature measurement. Those skilled in the art will recognize many techniques for sensing temperature and using the sensed temperature information to adjust duty cycle to maintain a desired color temperature profile.

Figure 8:
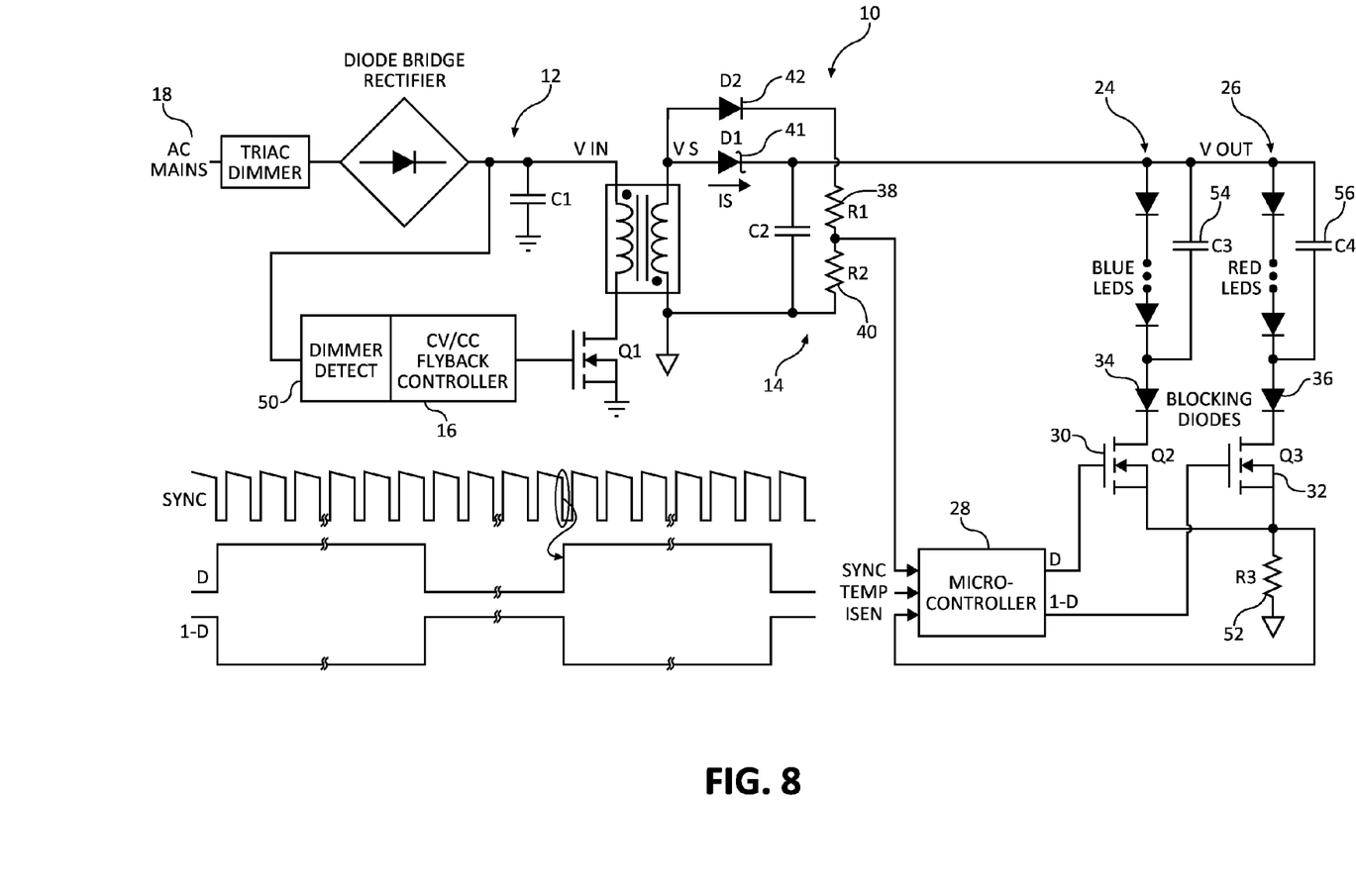
FIG. 8 is a schematic view illustrating a further embodiment of a LED lighting system.

FIG. 8 illustrates yet another embodiment of the LED lighting system 10. In the example shown in FIG. 8, dimmer support is added to control light intensity and color temperature as the system is dimmed. As shown, the flyback controller 16 includes a dimmer detection circuit 50, which senses the phase cut produced by a triac-based dimmer and automatically adjusts the flyback converter output current as the dimming level changes. The controller 28 on the secondary side 14 senses the total average output current and adjusts the duty cycle accordingly to either maintain a constant color temperature or shift the color temperature (e.g., to mimic an incandescent bulb which shifts towards red when dimmed). Current sensing may be provided by an optional resistor (R3) 52 in FIG. 8. The controller 28 may include an analog-to-digital converter (ADC) to measure the total average current and use the current information in the duty cycle control algorithm, to provide a desired color temperature profile as light intensity varies.

Figure 10:
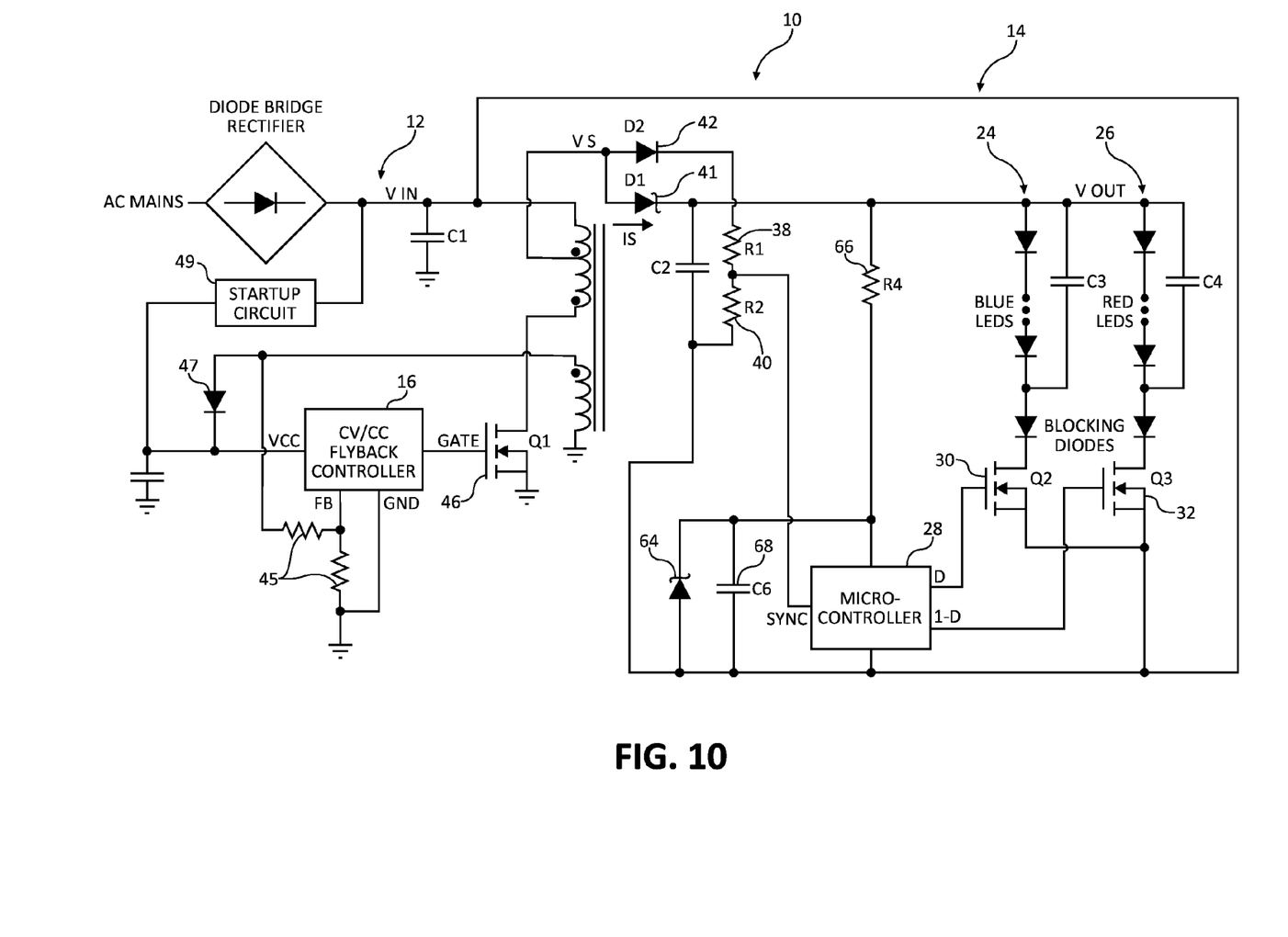
FIG. 10 is a schematic view illustrating yet a further embodiment of a LED lighting system.

Although not shown for clarity, it should be understood that secondary side bias supply for controller 28 may be provided by a secondary side auxiliary winding coupled to a capacitor through a rectifier diode in a similar manner that power ($V_{CC}$) is supplied to the primary side controller 16. Alternatively, Vcc can be produced by a simple shunt regulator (e.g., based on a zener diode and series resistor as shown in FIG. 10) or series regulator (e.g., linear or LDO regulator) coupled to the output of the flyback converter.

Capacitors (C3, C4) 54 and 56 referred to, for example, in FIG. 8 store the forward voltage of the LED strings when off, such that each time the string is re-activated, the LEDs are nominally biased (i.e., minimal current is required to recharge the storage capacitor), which ensures close to ideal LED current ratio and maximum efficiency. There may be a large difference between the forward voltage drops across the red and blue LED strings, and therefore, the blocking diodes 34 and 36 are used to prevent reverse current from flowing in the off LED string.

Further, although not shown as such in the drawings, in all embodiments of the present invention, only the string with the smallest forward voltage drop may need a series switch to turn the string off (i.e. deactivate). The larger voltage string is automatically off when the smaller LED voltage string is on (i.e., activated), provided the difference in the forward voltage drops of the LED strings is large enough to ensure there is insignificant leakage current in the larger LED voltage string when it is supposed to be off. The switches 30 and 32 have been shown on all LED strings in all embodiments of the present invention for illustrative purposes and clarity.

FIG. 9 illustrates yet another embodiment of the LED lighting system 10. The embodiment shown in FIG. 9 includes a third (e.g., green) LED string 58 connected in parallel with the blue and red LED strings 24 and 26, which is controlled by switch 60. In the example shown in FIG. 9, the controller 28 operates the LED strings 24, 26, and 58 in a sequential manner such that current flows through one, and only one, of the LED strings at any given time. As such, in FIG. 9, the PWM switching frequency may be equal to the inverse of the pulse width modulation control period (i.e., 1/TPWM), and TPWM=T1+T2+T3, where T1, T2, and T3 represent the on time pulse widths of the blue, red, and green LED strings, respectively.

Although FIG. 9 (and other embodiments described herein) illustrates parallel connected LED strings, the LED strings could also be connected in series, or the strings could be connected in any combination of parallel and/or series arrangements, with appropriately connected switches to either open circuit or short-circuit the strings that are off.

FIG. 10 illustrates a further embodiment of the LED lighting system 10, which utilizes a non-isolated AC/DC power converter. As such, of particular interest in FIG. 10 is that the transformer 22 from previous embodiments has been replaced with a tapped inductor 62. In the example shown in FIG. 10, the LED output and control circuitry "floats" on top of the rectified AC line voltage ($V_{IN}$) and is fed from the tapped inductor 62, which provides the LED power supply ($V_S$). Also in the embodiment shown in FIG. 10 is a simple shunt regulator that provides power ($V_{DD}$) to the controller 28. The shunt regulator includes a zener diode (D4) 64, resistor (R4) 66, and capacitor (C6) 68. This type of shunt regulator may be utilized to provide power to controller 28 in the aforementioned isolated systems (e.g., FIG. 1), as well.

Thus, the embodiments described herein provide the use of a simple, synchronized time multiplexed or pulse width modulated switching circuit on the secondary side of primary side controlled CV/CC, or constant current (CC), flyback converters to precisely control color temperature of a solid-state light bulb without any additional costly DC/DC conversion circuitry or isolation barrier coupling devices.

The PWM circuit (e.g., the controller 28) controls color temperature by controlling current ratio(s) in multiple strings of LEDs on the secondary side of a primary side controlled CV/CC flyback converter. PWM switching is synchronized to flyback switching to ensure stability and maximum efficiency, which is achieved with a simple and inexpensive circuit.

As such, the embodiments described herein enable automatic control of solid state lighting (SSL) color temperature profiles. For example, color temperature may be maintained as operational conditions (such as ambient temperature and AC line voltage) vary, or color temperature may be shifted, for example, to mimic an incandescent bulb, which shifts toward red when dimmed.

Additionally, an isolation barrier coupling device, such as an opto-coupler or isolated driver, is not needed, nor is secondary side DC/DC conversion circuitry.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A LED lighting system comprising:
    a transformer comprising a primary winding and a secondary winding;
    a plurality of LED strings coupled to the secondary winding of the transformer;
    at least one switch coupled to at least one of the plurality of LED strings; and
    a controller coupled to the at least one switch and configured to control the operation of the at least one switch such that current flows through the plurality of LED strings, alternating between flowing through each LED string of the plurality of LED strings, wherein the at least one switch operates to switch which LED string the current flows through when there is substantially no current flowing through the secondary winding of the transformer.

2. The system of claim 1, wherein the plurality of LED strings comprises a first LED string and a second LED string, and the at least one switch comprises a first switch coupled to the first LED string and a second switch coupled to the second LED string.

3. The system of claim 2, wherein the controller is configured such that the first switch is operated at a first duty cycle and the second switch is operated at a second duty cycle.

4. The system of claim 3, wherein the first duty and the second duty cycle are complementary.

5. The system of claim 4, wherein the controller is further configured to adjust the first duty cycle and the second duty cycle based on a temperature of the plurality of LED strings.

6. The system of claim 4, wherein the controller is further configured to adjust the first duty cycle and the second duty cycle based on a current flowing through the plurality of LED strings.

7. The system of claim 4, wherein the controller is further configured to adjust the first duty cycle and the second duty cycle based on a change in the current through the transformer.

8. The system of claim 4, further comprising a primary side switch coupled to the primary winding of the transformer, and wherein the alternating between the first and second switch is synchronized with switching of the primary side switch.

9. The system of claim 3, wherein the plurality of LED strings further comprises a third LED string, and the plurality of switches further comprises a third switch coupled to the third LED string, the controller is configured such that the third switch is operated at a third duty cycle, and the first duty cycle, the second duty cycle, and the third duty cycle are complementary.

10. A method for operating an array of LEDs, the method comprising:
receiving a current through a transformer comprising a primary winding and a secondary winding;
operating a first switch coupled to a first LED string of the array of LEDs and the secondary winding of the transformer; and
operating a second switch coupled to a second LED string of the array of LEDs and the secondary winding of the transformer such that current flows through one of the LED strings of the first LED string and the second LED string, alternating between flowing through the first LED string and the second LED string, wherein operating at least one switch of the first switch and the second switch comprises switching which LED string of the first LED string and the second LED string the current flows when there is substantially no current flowing through the secondary winding of the transformer.

11. The method of claim 10, further comprising
operating a first switch coupled to a first LED string of the array of LEDs and the secondary winding of the transformer at a first duty cycle; and
operating a second switch coupled to a second LED string of the array of LEDs and the secondary winding of the transformer at a second duty cycle.

12. The method of claim 11, further comprising adjusting the first duty cycle and the second duty cycle based on a temperature of the array of LEDs.

13. The method of claim 11, wherein the operating of the first switch and the second switch is synchronized with switching of a primary side switch coupled to the primary winding of the transformer.

14. The method of claim 11, further comprising adjusting the first duty cycle and the second duty cycle based on a current flowing through the array of LEDs.

15. The method of claim 11, further comprising adjusting the first duty cycle and the second duty cycle based a change in the current through the transformer.

16. A LED lighting apparatus comprising:
a plurality of LED strings;
at least one switch coupled to the plurality of LED strings; and
a controller coupled to the at least one switch and configured to control the operation of the at least one switch in a complementary manner such that current flows through the plurality of LED strings, alternating between flowing through each LED strings of the plurality of LED strings, wherein the at least one switch operates to switch which LED string the current flows through when there is substantially no current flow through an inductor coupled to the plurality of LED strings.

17. The apparatus of claim 16, wherein the plurality of LED strings comprises a first LED string and a second LED string, the at least one switch comprises a first switch coupled to the first LED string and a second switch coupled to the second LED string, and wherein the controller is configured such that first switch is operated at a first duty cycle D and the second switch is operated at a second duty cycle D', wherein D'=1−D.

\* \* \* \* \*